United States Patent [19]
Zoiss

[11] Patent Number: 5,832,081
[45] Date of Patent: Nov. 3, 1998

[54] TELEPHONE SET LINE CORD STRAIN RELIEF ATTACHMENT ASSEMBLY

[75] Inventor: Edward J. Zoiss, Moorpark, Calif.

[73] Assignee: Harris Corporation

[21] Appl. No.: 869,525

[22] Filed: Jun. 6, 1997

Related U.S. Application Data

[63] Continuation-in-part of Ser. No. 754,075, Nov. 20, 1996, Pat. No. 5,755,590.

[51] Int. Cl.$^6$ ........................................................ H04M 1/00
[52] U.S. Cl. ............................ 379/438; 379/437; 379/451
[58] Field of Search ...................................... 379/438, 437, 379/451; 439/445, 469

[56] References Cited

U.S. PATENT DOCUMENTS

| | | | |
|---|---|---|---|
| 4,177,362 | 12/1979 | Boenecke | 379/438 |
| 4,518,830 | 5/1985 | Drexler et al. | 379/438 |

*Primary Examiner*—Jack Chiang
*Attorney, Agent, or Firm*—Charles E. Wands

[57] ABSTRACT

A line cord strain relief attachment assembly facilitates insertion and replacement of a two conductor line cord terminated by relatively small geometry terminal lug connectors, rather than a larger modular style multiconductor connector, such as an RJ-45 plug. The line cord strain relief attachment assembly includes a generally cylindrically configured strain relief element, made of a suitable flexible and waterproof material and having a flange spaced apart from one end of the element. The strain relief element has a diameter proximate to that of a generally circular aperture in a rear wall of the test set. Adjacent to the one end of the strain relief element its cross-section is reduced to form a sloped recess region. A line cord retention wedge has a slot which conforms with the recess region of the strain relief element. The slot is bounded by opposing ramp-configured walls, that are sloped to conform with the sloped surface of the tapered recess region of the strain relief element. As a result, when the line cord retention wedge is inserted into the test set and engages the sloped recess region of the strain relief element, the strain relief element is drawn into the aperture of the test set, bringing the flange of the strain relief element into sealing engagement with the external surface of the test set.

12 Claims, 2 Drawing Sheets

TELEPHONE SET LINE CORD STRAIN RELIEF ATTACHMENT ASSEMBLY

CROSS-REFERENCE TO RELATED APPLICATIONS

The present application is a continuation-in-part of U.S. patent application Ser. No. 08/754,075, filed Nov. 20, 1996, U.S. Pat. No. 5,755,590, entitled: "Line Cord Strain Relief Attachment for Telephone Test Set," by E. Zoiss et al, hereinafter referred to as the '075 application, which is assigned to the assignee of the present application and the disclosure of which is herein incorporated.

FIELD OF THE INVENTION

The present invention relates in general to portable telecommunication devices, such as telephone test sets, and is particularly directed to a new and improved line cord strain relief attachment assembly that facilitates installation and replacement of the line cord and provides a secure strain-relieving, weatherproof seal at the external juncture of the line cord with the body of the test set.

BACKGROUND OF THE INVENTION

As described in the above-referenced '075 application, telecommunication devices, including but not limited to portable communication devices, such as telephone craftsperson's test sets, are typically equipped with a wireline communication cable, through which the device may be physically and electrically engaged with a telecommunication link access location, such as a connection port of another piece of equipment.

As a non-limiting example, such a wireline communication cable may comprise a section of multi-wire line cord, opposite ends of which are terminated with electrical connectors, such as terminal lugs, alligator clips, or modular style connector plugs (such as an RJ-45 modular style connector plug, as a non-limiting example). The line cord may further include a second section of multi-wire cable, one end of which is terminated for connection with the internal circuitry of the test set, and the other end of which is provided with a separate or auxiliary set of connectors, thereby enabling the test set to be coupled to different connection points of a telephone network.

To provide strain relief for the connection of the line cord with the telecommunication device, it has been conventional practice to employ an attachment interface having a serpentine or tortuous path for the line cord. While such a strain relief interface provides some protection for the line cord attachment of a consumer telephone device, it is wholly inadequate for a telephone test set which set must be ruggedized against physical hazards, including severe handling and the environment. This strain relief mandates a line cord attachment configuration, that is more robust and provides a barrier against the entry of moisture and foreign matter, while also facilitating replacement of the line cord.

To meet this objective, the inventive line cord strain relief attachment arrangement described in the '075 application is configured as diagrammatically illustrated in the enlarged partial perspective view of FIG. 1 to include a line cord strain relief engagement cavity 11 that is formed at one end of test set body 10, a rear portion of which is shown. Front walls 13 and 14 of cavity 11 have a slot 15 therebetween, through which the line cord 20, shown in FIG. 2, extends into and through the interior (battery compartment) of the test set 10, so that a multiconductor modular style connector plug 16 at a terminal end of the line cord may be connected to a corresponding modular style receptacle mounted on a printed wiring board within the test set.

The cavity 11 communicates with an exterior surface 12 of the test set body through a generally rectangular tunnel 31, that is sized to snugly receive a generally rectangular solid-shaped line cord strain relief element 30. A first end 35 of the line cord strain relief element 33 has a grooved neck 37 that is insertable into the cavity 11, and is configured to be captured by a complementary configured slot 41 of a wedge-shaped line cord retention plug 40. The surface of the grooved neck 37 of the strain relief element 33 is tapered relative to the rear wall 45 of the cavity 11, so that insertion of the line cord retention plug 40 causes the line cord strain relief element 33 to be drawn into the body of the test set, thereby urging surface 51 of a flange 50 of the line cord strain relief element 40 against the exterior surface 12 of the test set body, and providing a tight weatherproof seal around the tunnel 31.

Projecting from the flange 50 of the line cord strain relief element, 30 is a generally cylindrically shaped shroud section 53 having a longitudinal bore 55, which is sized to snugly receive the line cord 20, so that the shroud section 53 provides a weatherproof seal around the line cord as it extends through the strain relief element 30 and into the test set 10. To replace the line cord, the cord retention plug 40 is removed from the cavity 11 by means insertion of a screwdriver or the like into slot 41, so that the retention plug 40 may become detached from the grooved neck 37 of the strain relief element. This frees the neck end 35 of the strain relief element 30, so that the strain relief element may be pulled out of the tunnel 31, thereby allowing the old line cord to be fully removed from the test set, and a new line cord inserted.

Now although the inventive line cord strain relief attachment described in the '075 application facilitates installation and replacement of the line cord, while also providing a secure strain-relieving, weatherproof seal at the external juncture of the line cord with the body of the test set, the attachment is configured for use with a multiconductor line cord that is terminated in a multiconductor modular style connector plug. As a consequence, the geometry of the tunnel must allow passage therethrough of such a relatively large connector plug, so that it may engage a corresponding modular style receptacle mounted within the test set.

However, not all line cords are configured the same, nor do they have the same cross-sectional dimensions, so that they do not necessarily require the geometry of the components described above. Thus, a more simplified configuration that still provides the functionality of the attachment of the strain relief element detailed in the '075 application is desired, particularly for line cords that contain only a pair of conductors terminated in individual connectors, such as circular lugs, that may be readily mechanically and electrically connected to terminal pads of the internal circuitry of the test set.

SUMMARY OF THE INVENTION

To meet this need, the present invention provides a simplified modification of the line cord strain relief attachment configuration described in the '075 application, that facilitates insertion and replacement of a smaller dimensioned line cord, such as a two conductor line cord terminated by relatively small geometry terminal lug connectors, rather than a larger modular style multiconductor connector, such as an RJ-45 connector plug.

For this purpose, the line cord strain relief attachment assembly of the present invention includes a physically flexible and waterproof strain relief element, having a diameter that is proximate that of generally circular line cord entry aperture in a rear wall of the test set. Adjacent to the first end of the strain relief element its cross-section is reduced, so as to form a wedge-shaped recess region. The surface contour of this recess region has a generally regular geometry, so that it may be securely engageable by top and side walls of a slotted line cord retention wedge.

The slotted line cord retention wedge has a generally U-shaped slot which conforms with a flat top surface and flat side surfaces of the recess region of the strain relief element. One side of the retention wedge around the U-shaped slot is bounded by a generally wedge-shaped wall structure having a pair of opposing ramp-configured walls and a top wall. The slope of the surfaces of the ramp-configured walls of the wedge-shaped wall structure generally conform with the taper of an end surface of the recess region of the strain relief element. The other side of the retention wedge is generally flat, so as to be conformable with and slideable along the interior surface of the test set wall adjacent to the line cord entry aperture.

These mutually conforming shapes of the U-shaped slot of the retention wedge and the recess region of the strain relief element cause the retention wedge to urge the strain relief element against the rear wall of the test set, as the retention wedge is pushed into the recess region of the strain relief element along the interior surface of the test set end wall. As the retention wedge is pushed further along the interior wall surface of the test set and into the recess region of the strain relief element its action against the wall structure of the retention wedge causes cause the strain relief element to be urged into the body of the test set, thereby tightening a flange of the strain relief element against the exterior surface of the test set, and sealing the line cord entry aperture. Projecting from the flange of line cord strain relief element is shroud. The line cord itself is snugly received by a longitudinal passageway through the strain relief element, so that the shroud provides a further weatherproof seal around the line cord.

To facilitate replacement of the line cord, the top wall of the retention wedge has a pair of flanges that are readily gripped by a craftsperson's fingers or a tool such as pliers. In addition, a reinforcement rib at the top wall can be seized by a tool such as pliers, to assist in removal of the retention wedge from the recess region of the strain relief element. Once the retention wedge has become detached from the recess region of the strain relief element, the strain relief element may be pulled out of the aperture in the test set wall, thereby allowing the line cord to be fully removed from the test set.

DETAILED DESCRIPTION

Figure 1:
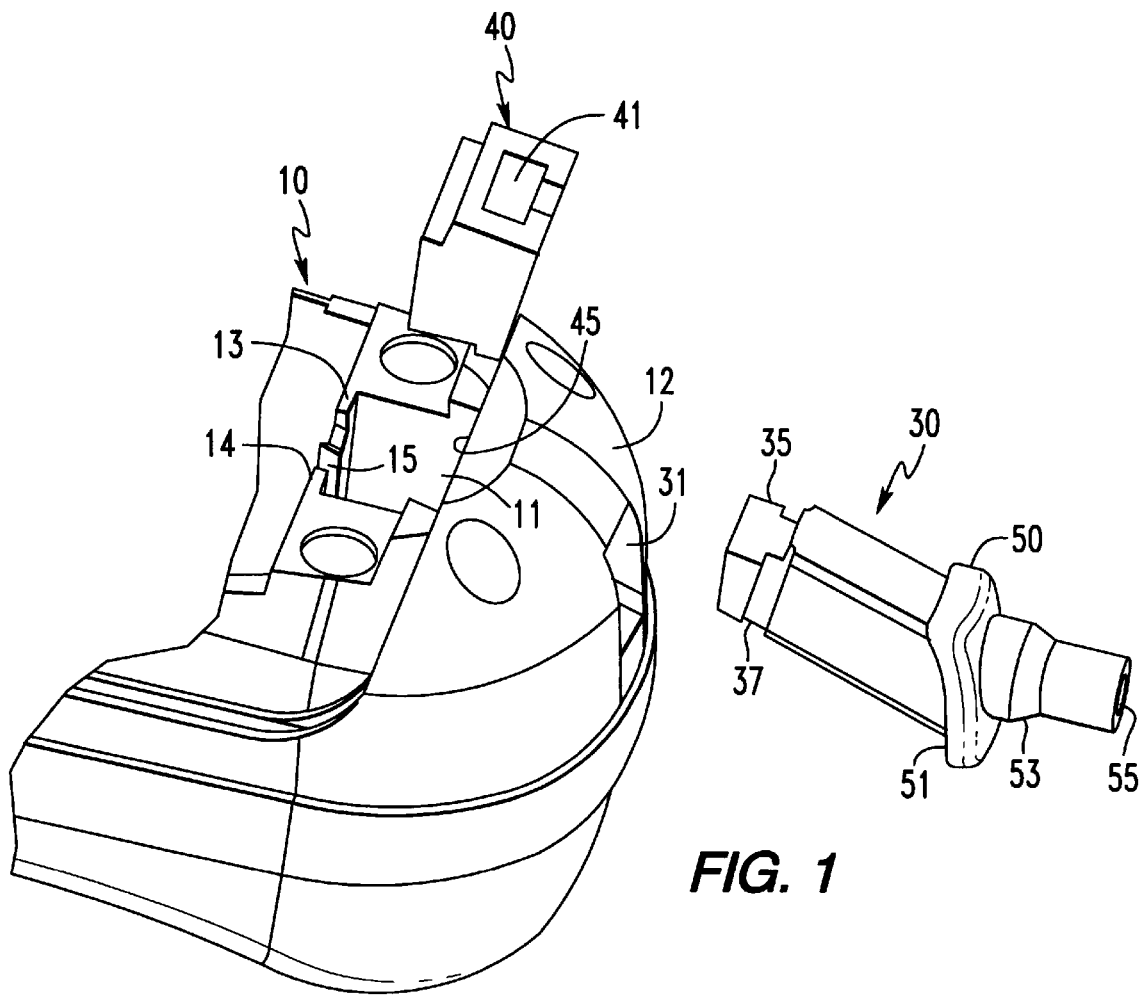
FIG. 1 is an enlarged perspective view of a portion of a telephone test set and the line cord strain relief attachment arrangement described in the above-referenced '075 application.
Figure 2:
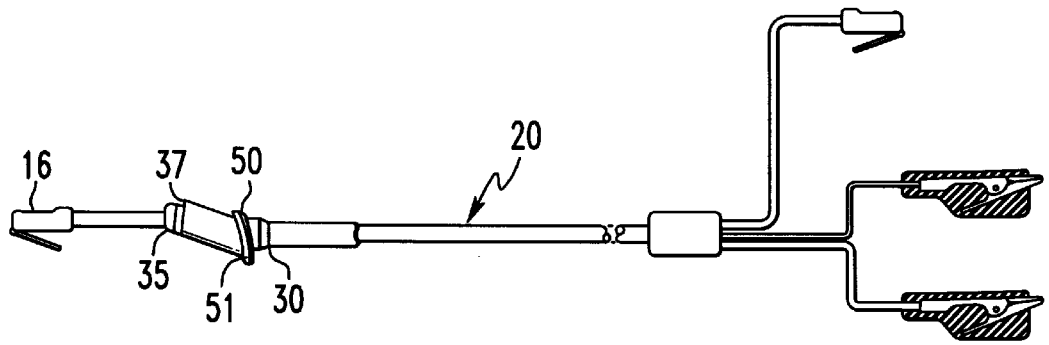
FIG. 2 diagrammatically shows a multiconductor line cord terminated at its opposite ends with modular style connector plugs and alligator clips, and being fitted with the strain relief attachment arrangement of FIG. 1.

A preferred embodiment of the line cord strain relief attachment assembly of the present invention will now be described with reference to FIG. 3, which diagrammatically illustrates an enlarged perspective view of a portion of a test set body or housing 100, which is engaged by a line cord strain relief attachment assembly, shown within broken lines 200. Test set housing 100 has a rear wall 102 that contains a generally circular, line cord entry aperture 104, which is sized to accommodate passage therethrough of a reduced diameter test set cord, such as a standard two-wire line cord, a portion of which is shown at 110 in FIG. 4. For this purpose, the rear wall aperture 104 may have a diameter on the order of 700 mils, as a non-limiting example. As shown in FIG. 4, each conductor 111 and 113 of line cord 110 is typically terminated by a circular terminal lug, as diagrammatically illustrated at 121 and 123, which are readily physically and electrically attached to a circuit board terminal site of the test set's internal circuitry, by way of threaded screws and the like.

The line cord strain relief element attachment assembly 200 includes a line cord strain relief element 210, comprised of a suitable flexible and waterproof material, such as neoprene rubber, as a non-limiting example. A first end 212 of the strain relief element 210 has a generally circular diameter proximate that of the test set's line cord entry aperture 104, so that it is readily is insertable through the aperture 104 of the rear wall 102 of the test set body 100.

Adjacent to the first end 212 of the element 210, the cross-section of element 210 is reduced and shaped to form a tapered recess region 214. The surface of tapered recess region 214 may have a generally regular (polygonal) shape, such as an octagonal geometry as a non-limiting example, that is readily securely engageable by the top and side walls of a line cord retention wedge 230, to be described. A first or rearward end of the tapered recess region 214 is bounded by a generally circular or disc-shaped end wall region 221, having a generally flat surface 223 that intersects the polygonal surfaces of recess region 214 and a thickness 225 that is proximate to the thickness of the rear wall 102 of the test set.

A flange 250 projects from the strain relief element adjacent to the disc-shaped end wall region. The flange 250 is configured to generally conform with the exterior surface 106 of the rear wall 102 of the test set body 100. A second or forward end of the recess region 214 is bounded by a tapered, somewhat oval end wall 231. End wall 231 also has a generally flat surface that intersects the polygonal surfaces of recess region 214 at an acute angle providing a tapering thickness 235. Flange 250 has a notched surface 253, that facilitates gripping and control of the line cord strain relief element 210, during insertion and removal.

As will be described, because the surface of the end wall 231 of recess region 214 of the strain relief element 210 is tapered, its engagement with the line cord retention wedge 230 will cause the end 212 of the line cord strain relief element 210 to be drawn into the test set 100, and urge flange 250 of the strain relief element 210 against the exterior surface 106 of the test set, thus creating a tight weatherproof seal around the aperture 104.

Projecting from flange 250 of line cord strain relief element 210 is a generally conical solid portion 256 that extends to a cylindrically shaped shroud 260. The outer surface of the shroud 260 may be provided with one or more relief regions 264 to facilitate gripping of the shroud. Extending through the strain relief element 210 is a longitudinal bore 270 which is sized and shaped to snugly receive the line cord 110, so that the shroud 260 provides a weatherproof seal around a line cord extending through the strain relief element 210.

In order to releasably secure the strain relief element 210 to the test set, the line cord retention wedge 230 is preferably made of a hard plastic material (such as Xenoy (TM) plastic, available from G. E. Plastics), and has a generally rectangular U-shaped slot 232, which conforms with the flat top surface 215 and the side surfaces 217 of the recess region 214 of the strain relief element 210, described above. The U-shaped slot 232 of the retention wedge 230 is bounded by a generally wedge-shaped wall structure 280 comprised of a pair of opposing ramp-configured walls 281 and 283 and a top wall 285. The inclination or slope of the surfaces 291 and 293 of the ramp-configured walls 281 and 283, respectively, of the wedge-shaped wall structure 280 generally conforms with the slope or taper of the surface of the oval end wall 231 of strain relief element 210. These mutually conforming shapes of the U-shaped slot 232 of the retention wedge 230 and the recess region 214 of the strain relief element 210 enable the retention wedge 230 to capture the strain relief element 210, as the retention wedge 230 is urged along the interior surface of the test set end wall 102 and engages recess region 214 of the strain relief element 210 that has been inserted through the line cord entry aperture 104.

Thus, unlike the strain relief attachment arrangement described in the above-referenced '075 application, there is no retention plug-receiving cavity having a geometry which conforms with that of the retention plug. Here, the retention wedge 230 is essentially self-engaging with the rear wall 102 of the test set and the strain relief element 210, the thereby simplifying the interior structure of the test set body and providing ease of access to the interface between the strain relief element 210 and the retention wedge 230.

Figure 3:
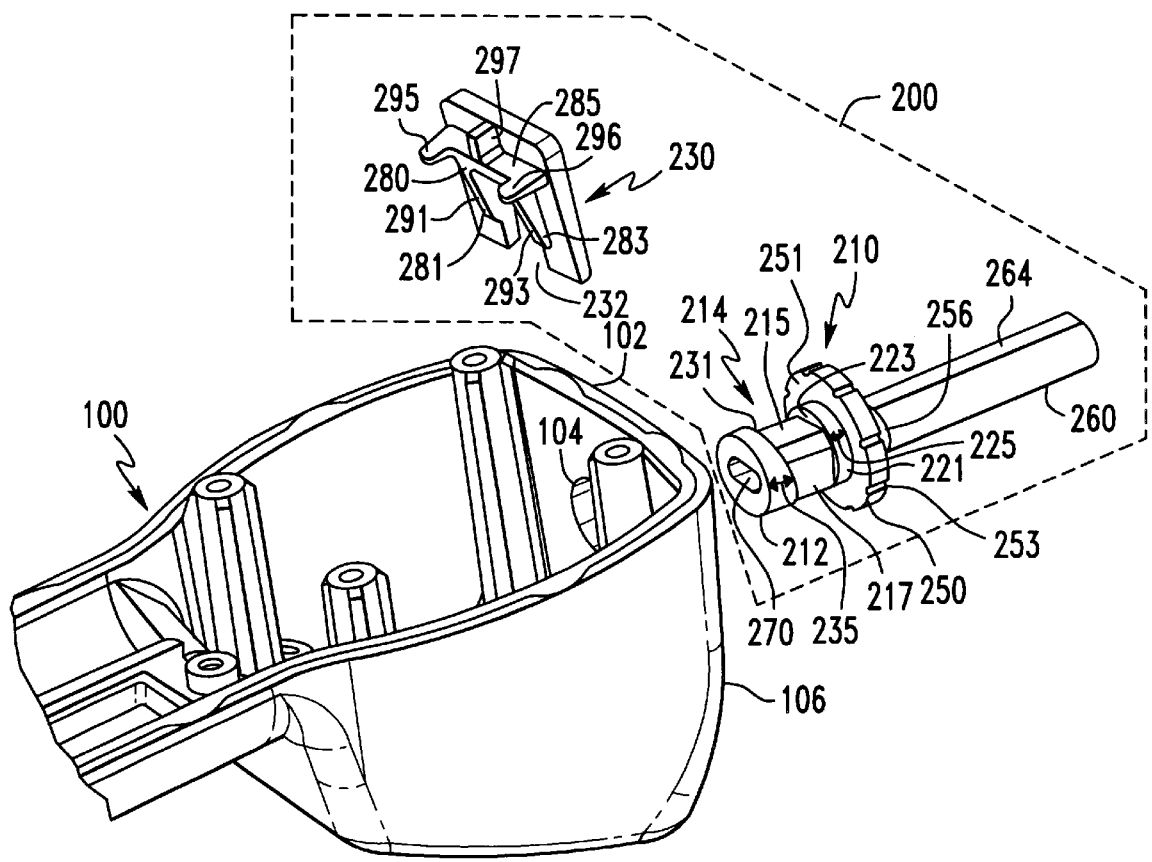
FIG. 3 diagrammatically illustrates the line cord strain relief attachment assembly of the present invention will.
Figure 4:
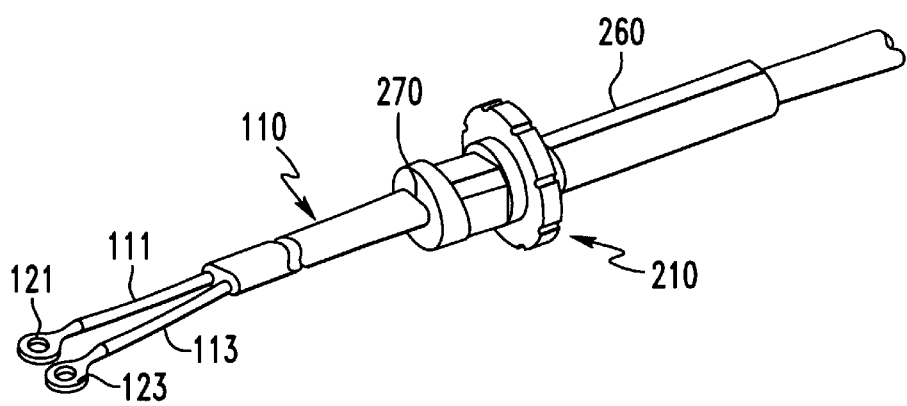
FIG. 4 shows a portion of a standard two-wire line cord.

More particularly, with the mating portion to test set body portion 110 removed, access is provided to the interior of the test set, as shown in FIG. 3. The end 212 of the strain relief element 210, from which the two conductors 111 and 112 of the line cord 110 extend, is inserted from outside of the test set body through the line cord entry aperture 104. This allows the terminal lugs 121 and 123 to be attached to a circuit board terminal site of the test set's internal circuitry (not shown), by way of threaded screws and the like, as described above. The line cord retention wedge 230 is then engaged with the strain relief element 210 and the interior wall surface of the test set, such that the wedge-shaped U-shaped slot 232 of the retention wedge 230 engages the recess region 214 of strain relief element 210.

The mutually conforming shapes of the U-shaped slot 232 of retention wedge 230 and the recess region 214 of the strain relief element 210 enable the retention wedge 230 to pull the strain relief element 210 against the rear wall 102 of the test set, as the retention wedge 230 is urged along the interior surface of the test set end wall 102. This will cause the line cord strain relief element 210 to be drawn or urged into the body of the test set, thereby tightening the surface 251 of the flange 250 of the strain relief element 210 against the exterior surface of the test set, and providing a weatherproof around the line cord entry aperture 104.

In order to facilitate replacement of the line cord 110, the top wall 285 of the cord retention wedge 230 has a pair of tabs 295 and 296, that are sized and positioned to be gripped by a craftsperson's fingers or a tool such as pliers. In addition, a rib 297 is used to reinforce the top wall 285. It also can be gripped by a tool such as pliers, to assist in removal of the cord retention wedge. Once the cord retention wedge 230 has been detached from the wedge-shaped recess region 214 of the strain relief element 210, the strain relief element may be pulled out of the line cord entry aperture 104, thereby allowing the line cord 110 to be fully removed from the test set.

As will be appreciated from the foregoing description, the line cord strain relief attachment assembly of the present invention provides the craftsperson with a relatively simplified configuration that possesses the functionality of the attachment of the strain relief attachment detailed in the '075 application, but in an architecture that is particularly suited for line cords containing a reduced number (pair) of conductors that are terminated in individual connectors, such as circular lugs, rather than larger, modular style multiconductor connectors, such as an RJ-45 connector plug. The combination of mutually engaging strain relief and retention wedge elements provides the desired robust strain relief, and a barrier against moisture and foreign matter, and also facilitates replacement of the line cord.

While I have shown and described an embodiment in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed:

1. A strain relief attachment assembly for attaching an electrical line cord to a utility device, said utility device having a line cord entry aperture through a body wall thereof, said electrical line cord passing through said aperture for engagement with an electrical connector at a location within said utility device comprising:

a line cord strain relief element having a tapered recess region and being insertable through said aperture in said body wall of said utility device, said strain relief element including a passageway through which said line cord extends and a flange which is configured to generally conform with an external surface of said body of said utility device adjacent to said aperture; and a line cord retention wedge having a slot that is bounded by a generally wedge-shaped wall structure comprised of opposing ramp-configured walls, that are sloped to conform with a sloped surface of said tapered recess region of said line cord strain relief element, so as to draw said line cord strain relief element into said aperture of said utility device and thereby urge said flange of said line cord strain relief element into sealing engagement with said external surface of said body of said utility device.

2. A strain relief attachment assembly according to claim 1, wherein said line cord contains wires each of which is terminated within said utility device by a respective terminal conductor having a size less than that of said aperture.

3. A strain relief attachment assembly according to claim 1, wherein said line cord is a two-wire line cord.

4. A strain relief attachment assembly according to claim 3, wherein said utility device comprises a telephone test set.

5. A strain relief attachment assembly according to claim 1, wherein said line cord strain relief element further includes a shroud having a bore sized to snugly receive said line cord, so that said shroud provides a seal around the line cord as it extends through said bore in said strain relief element and into said utility device.

6. A strain relief attachment assembly according to claim 1, wherein said generally wedge-shaped wall structure of said line cord retention wedge includes one or more tabs that are sized to be readily gripped to facilitate removal of said line cord retention wedge from engagement with said strain relief element.

7. A strain relief attachment assembly according to claim 6, wherein said generally wedge-shaped wall structure is further comprised of a top wall and a reinforcing rib, which can be gripped to assist in removal of said line cord retention wedge from said recess region of said strain relief element.

8. A strain relief attachment assembly for attaching a two-conductor line cord to a telephone test set, said telephone test set having a body end wall in which line cord aperture is formed, said two-conductor line cord passing through said aperture and terminating in respective connectors for engagement with terminal connectors within said telephone test set comprising:

a line cord strain relief element, having an end portion containing a tapered recess region that is sized to conform with and be insertable through said aperture in said body wall of said test set, said strain relief element including a passageway through which said line cord extends and a flange which is configured to generally conform with an external surface of said body of said test set adjacent to said aperture, and a line cord retention wedge having a slot which conforms with said tapered recess region of said line cord strain relief element, said slot being bounded by opposing ramp-configured walls, that are sloped to conform with a sloped surface of said tapered recess region of said line cord strain relief element, so that when said line cord retention wedge is inserted into said test set and engages said recess region of said strain relief element, said line cord strain relief element is drawn into said aperture of said test set, bringing said flange of said line cord strain relief element into sealing engagement with said external surface of said body wall of said test set.

9. A strain relief attachment assembly according to claim 8, wherein each wire of said two-wire line cord is terminated within said test set by a respective electrical termination having a size less than that of said aperture.

10. A strain relief attachment assembly according to claim 8, wherein said line cord strain relief element further includes a shroud having a bore sized to snugly receive said line cord, so that said shroud provides a seal around the line cord as it extends through said strain relief element and into said telephone test set.

11. A strain relief attachment assembly according to claim 10, wherein said line cord retention wedge includes one or more tabs that are sized to be gripped for removing said line cord retention wedge from said strain relief element.

12. A strain relief attachment assembly according to claim 11, wherein said retention wedge further comprises a top wall and a reinforcing rib, which can be gripped to assist in removal of said line cord retention wedge from said recess region of said line cord strain relief element.

* * * * *